(12) United States Patent
Kitaura

(10) Patent No.: US 12,165,551 B2
(45) Date of Patent: Dec. 10, 2024

(54) ELECTRONIC DEVICE AND CONNECTION INSPECTION METHOD

(71) Applicant: Sharp NEC Display Solutions, Ltd., Tokyo (JP)

(72) Inventor: Shigeki Kitaura, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 30 days.

(21) Appl. No.: 18/015,681

(22) PCT Filed: Jul. 16, 2020

(86) PCT No.: PCT/JP2020/027653
§ 371 (c)(1),
(2) Date: Jan. 11, 2023

(87) PCT Pub. No.: WO2022/014005
PCT Pub. Date: Jan. 20, 2022

(65) Prior Publication Data
US 2023/0260435 A1    Aug. 17, 2023

(51) Int. Cl.
*G06F 3/038* (2013.01)
*G09G 3/00* (2006.01)

(52) U.S. Cl.
CPC ......... *G09G 3/006* (2013.01); *G09G 2330/12* (2013.01)

(58) Field of Classification Search
CPC .............. G09G 3/006; G09G 2330/12; G09G 2370/08; G09G 5/006; H04L 25/02
(Continued)

(56) References Cited

U.S. PATENT DOCUMENTS

2002/0011998 A1* 1/2002 Tamura ................ G09G 3/3611
    345/204
2008/0055303 A1* 3/2008 Ikeda .................... G06F 1/1601
    345/519
(Continued)

FOREIGN PATENT DOCUMENTS

JP    H 4-315781 A    11/1992
JP    2018-151915 A    9/2018
(Continued)

OTHER PUBLICATIONS

International Search Report (ISR) (PCT Form PCT/ISA/210), in PCT/JP2020/027653, dated Oct. 20, 2020 and English version.

*Primary Examiner* — Thuy N Pardo
(74) *Attorney, Agent, or Firm* — MCGINN I.P. LAW GROUP, PLLC.

(57) ABSTRACT

An electronic device includes: a first circuit including: a transmission port through which data is transmitted; and a reception port through which data is received and configured to be able to perform data communication with a second circuit through the transmission port and the reception port, wherein the first circuit includes an inspection processor configured to determine whether a detection signal indicating that the second circuit is able to communicate with the first circuit has been detected when data communication with the second circuit is not possible and to determine whether a potential of a reception signal line connected between the reception port and the second circuit is in a state in which communication is possible when the detection signal has not been detected.

12 Claims, 7 Drawing Sheets

(58) Field of Classification Search
USPC .......................................... 345/204, 205, 5
See application file for complete search history.

(56) References Cited

U.S. PATENT DOCUMENTS

| | | | | |
|---|---|---|---|---|
| 2010/0128182 | A1* | 5/2010 | Ichimura | .......... H04N 21/43635 |
| | | | | 348/E5.093 |
| 2013/0145413 | A1* | 6/2013 | Diab | .................. H04L 12/2816 |
| | | | | 725/109 |
| 2014/0205024 | A1* | 7/2014 | Toba | .................... H04N 21/816 |
| | | | | 375/240.28 |
| 2016/0065356 | A1* | 3/2016 | Huang | .................. G06F 13/362 |
| | | | | 370/296 |
| 2018/0267912 | A1 | 9/2018 | Kataoka et al. | |
| 2020/0350679 | A1* | 11/2020 | Yu | ............................ H01P 1/18 |

FOREIGN PATENT DOCUMENTS

| | | |
|---|---|---|
| WO | WO 2009/066607 A1 | 5/2009 |
| WO | WO 2018/163358 A1 | 9/2018 |

\* cited by examiner

ELECTRONIC DEVICE AND CONNECTION INSPECTION METHOD

TECHNICAL FIELD

Some of the present invention relate to an electronic device and a connection inspection method.

BACKGROUND ART

A technique of detecting a connection state when two electronic circuits are connected using a cable is known (for example, see Patent Document 1). In the related art described in Patent Document 1, a dedicated detection circuit is additionally provided to detect a connection state, and a warning is output when an abnormality of the connection state has been detected.

CITATION LIST

Patent Document

[Patent Document 1]
Japanese Unexamined Patent Application, First Publication No. H4-315781

SUMMARY OF INVENTION

Technical Problem

However, in the related art, a connection state can be detected, but it is difficult to determine a reason for a communication abnormality, for example, when two connected electronic circuits cannot communicate normally with each other.

Some aspect of the present invention were made to solve the aforementioned problem, and an objective thereof is to provide an electronic device and a connection inspection method that can appropriately determine a reason for a communication abnormality.

Solution to Problem

To solve the aforementioned problem, one aspect of the present invention is an electronic device including: a first circuit including: a transmission port through which data is transmitted; and a reception port through which data is received and configured to be able to perform data communication with a second circuit through the transmission port and the reception port, wherein the first circuit comprises an inspection processor configured to determine whether a detection signal indicating that the second circuit is able to communicate with the first circuit has been detected when data communication with the second circuit is not possible and to determine whether a potential of a reception signal line connected between the reception port and the second circuit is in a state in which communication is possible when the detection signal has not been detected.

In addition, one aspect of the present invention is a connection inspection method of detecting connection between a first circuit including at least a transmission port through which data is transmitted and a reception port through which data is received and a second circuit configured to be able to perform data communication through the transmission port and the reception port, wherein an inspection processor determines whether a detection signal indicating that the second circuit is able to communicate with the first circuit has been detected when data communication with the second circuit is not possible and determines whether a potential of a reception signal line connected between the reception port and the second circuit is in a state in which communication is possible when the detection signal has not been detected.

Advantageous Effects of Invention

According to some aspects of the present invention, it is possible to appropriately determine a reason for a communication abnormality.

DESCRIPTION OF EMBODIMENTS

Hereinafter, an electronic device and a connection inspection method according to an embodiment of the present invention will be described with reference to the accompanying drawings.

First Embodiment

Figure 1:
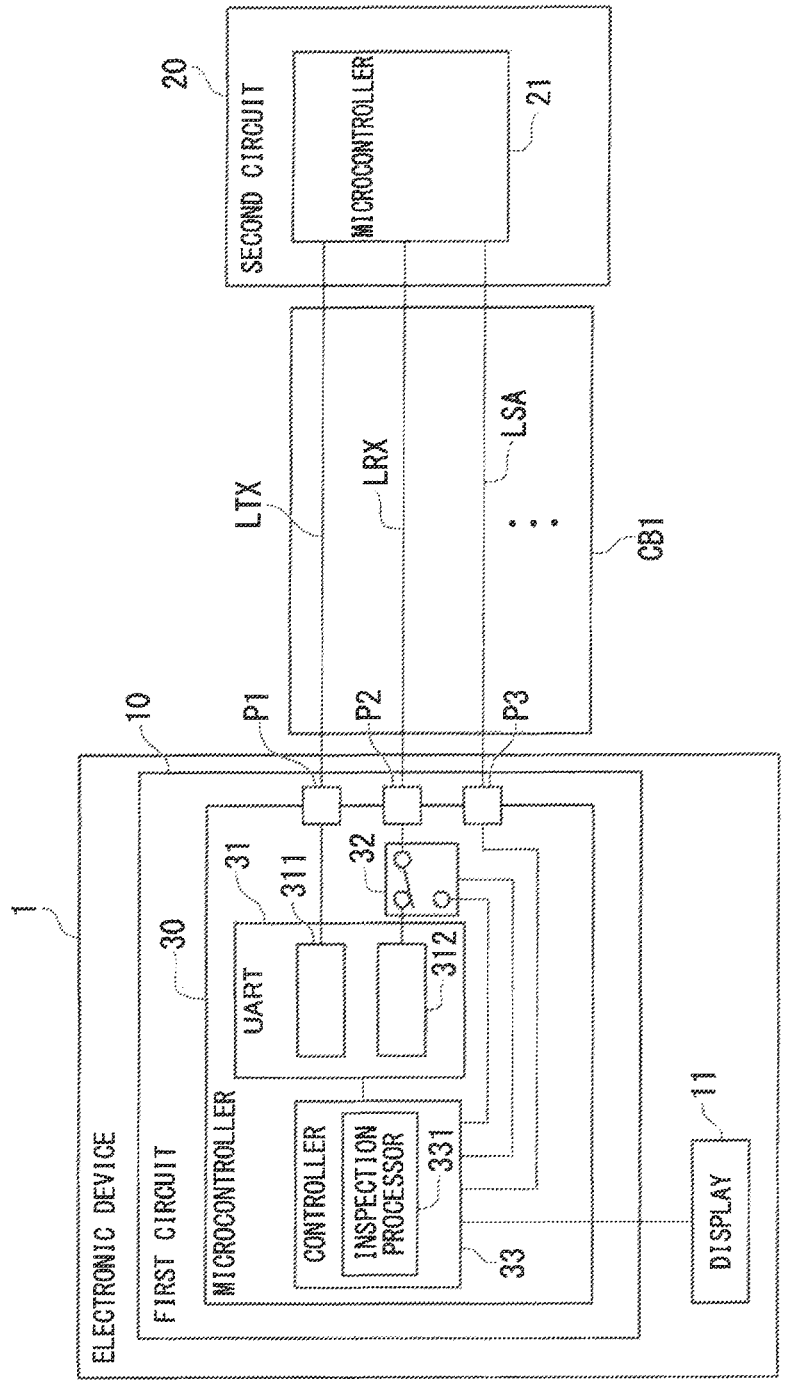
FIG. 1 is a block diagram illustrating an example of an electronic device according to a first embodiment.

FIG. 1 is a block diagram illustrating an example of an electronic device 1 according to a first embodiment.

As illustrated in FIG. 1, the electronic device 1 includes a first circuit 10 and a display 11.

The first circuit 10 is a circuit that can be connected to a second circuit 20 via a connection cable CB1. The first circuit 10 performs data communication with the second circuit 20, for example, using RS-232C which is an interface for serial data communication. The first circuit 10 includes a microcontroller 30. In the following description, the interface for serial data communication may be referred to as a serial communication interface.

The connection cable CB1 is a cable for connecting the first circuit 10 and the second circuit 20. The connection cable CB1 includes a transmission signal line LTX, a reception signal line LRX, and a detection signal line LSA for performing serial data communication using the RS-232C. Here, the transmission signal line TLX is a signal line for transmitting serial data from the first circuit 10 to the second circuit 20, and the reception signal line LRX is a signal line used for the first circuit 10 to receive serial data transmitted from the second circuit 20 to the first circuit 10. The detection signal line LSA is a signal line for the first circuit 10 to detect a detection signal (a signal A) output from the second circuit 20 to the first circuit 10.

The second circuit 20 is a circuit that can be connected to the first circuit 10 via the connection cable CB1 and includes a microcontroller 21.

The microcontroller 21 is, for example, a processor including a central processing unit (CPU) and comprehensively controls the second circuit 20. The microcontroller 21 controls communication with the first circuit 10. For example, when communication with the first circuit 10 is performed, the microcontroller 21 sets the reception signal line LRX (a signal line for transmission in the second circuit 20) to a High state indicating that data communication has been prepared. Here, the High state is a state in which a potential (a voltage) of a signal line is equal to or greater than a predetermined threshold potential (a threshold voltage). When communication with the first circuit 10 is possible, the microcontroller 21 outputs a detection signal (for example, a signal in the High state) indicating that communication with the first circuit 10 is possible to the detection signal line LSA.

When communication with the first circuit 10 is possible, the microcontroller 21 outputs a detection signal indicating that communication with the first circuit 10 is possible to the detection signal line LSA. For example, when it is detected that the transmission signal line LTX is in the High state, the microcontroller 21 outputs the High state as a detection signal (a detection signal A) to the detection signal line LSA.

The display 11 is, for example, a display device such as a liquid crystal display and is an example of an output. The display 11 of the electronic device 1 displays (outputs) information indicating a determination result from an inspection processor 331 which will be described later.

The microcontroller 30 is, for example, a processor including a CPU and comprehensively controls the first circuit 10. The microcontroller 30 includes a universal asynchronous receiver transmitter (UART) 31, a switcher 32, a controller 33, a transmission port P1, a reception port P2, and an input port P3.

The transmission port P1 is connected to the UART 31 and is a serial transmission port which is a port for transmitting serial data in the serial communication interface. The reception signal line LRX of the connection cable CB1 is connected to the transmission port P1.

The reception port P2 is connected to the UART 31 and is a serial reception port which is a port for receiving serial data in the serial communication interface. The reception signal line LRX of the connection cable CB1 is connected to the reception port P2. The reception port P2 is configured to switch between a function of a reception port and a function of a versatile input port using the switcher 32 which will be described later.

The input port P3 is a versatile input port and is connected to the detection signal line LSA of the connection cable CB1.

The UART 31 is for the serial communication interface and performs parallel-serial conversion and serial-parallel conversion. The UART 31 includes a shift register 311 and a shift register 312.

The shift register 311 is a shift register for transmission of serial data communication, converts parallel data supplied from the controller 33 to serial data, and outputs the serial data. The serial data output from the shift register 311 is output to the transmission signal line LTX connected thereto via the transmission port P1.

The shift register 312 is a shift register for reception of serial data communication, receives serial data from the reception signal line LRX connected thereto via the reception port P2 and the switcher 32, converts the serial data to parallel data, and supplies the parallel data to the controller 33.

The switcher 32 switches the reception port P2 to one of the function of a reception port and the function of a versatile input port. The switcher 32 switches the reception port P2 to one of the function of a reception port and the function of a versatile input port, for example, through setting of a control register which is not illustrated in the microcontroller 30.

The controller 33 is, for example, a functioner which is realized by causing a CPU which is not illustrated to execute a program and performs various processes of the first circuit 10 and the electronic device 1. For example, the controller 33 controls serial data communication with the second circuit 20 and performs an inspection process of inspecting a communication state and determining a reason why communication is not possible when serial data communication is not possible. For example, when serial data communication with the second circuit 20 is performed, the controller 33 sets the transmission ort P1 and the transmission signal line LTX to the High state indicating that data communication has been prepared.

The controller 33 includes an inspection processor 331.

The inspection processor 331 determines whether a detection signal indicating that the second circuit 20 can communicate with the first circuit 10 (for example, a signal in which the detection signal line LSA is in the High state) has been detected when the first circuit 10 cannot perform data communication with the second circuit 20. The inspection processor 331 may determine whether data communication with the second circuit 20 is possible depending on whether data can be received by the UART 31 via the reception signal line LRX and the reception port P2 or whether the potential of the reception signal line LRX is in the High state.

The inspection processor 331 determines whether the potential of the reception signal line LRX connected between the reception port P2 and the second circuit 20 is in a state in which communication is possible when a detection signal (for example, in the High state) from the detection signal line LSA cannot be detected. Here, when the potential of the reception signal line LRX is in a state in which communication is possible, this means that the potential of the reception signal line LRX is in the High state. That is, when the detection signal (for example, in the High state) from the detection signal line ISA cannot be detected, the inspection processor 331 determines whether the potential of the reception signal line LRX is in the High state.

When the detection signal (for example, in the High state) from the detection signal line LSA has been detected, the inspection processor 331 determines that an abnormality has occurred in a communication line on the second circuit 20 side associated with a signal in the signal line of the reception port P2. Here, the communication line on the second circuit 20 side is, for example, a signal line and a control line associated with the reception signal line LRX on the second circuit 20 side.

When the potential of the reception signal line LRX is not in a state in which communication is possible (when the potential of the reception signal line LRX is in a Low state), the inspection processor 331 determines that an abnormality has occurred in connection between the first circuit 10 and the second circuit 20. Here, the Low state indicates a state in which a potential (a voltage) of a signal line is less than a predetermined threshold potential (a threshold voltage). When an abnormality has occurred in connection between the first circuit 10 and the second circuit 20, for example, it means a connection failure of the connection cable CB1, a disconnection of a signal line of the connection cable CB1, or an erroneous connection of the connection cable CB1.

When the potential of the reception signal line LRX is in a state in which communication is possible (for example, the High state), the inspection processor 331 determines that an abnormality has occurred in the second circuit 20. In this case, the inspection processor 331 determines, for example, that the second circuit 20 is not operating normally.

When the potential of the reception signal line LRX is detected, the inspection processor 331 switches the reception port P2 from the function of the reception port for reception of serial data communication to the function of the versatile input port using the switcher 32. The inspection processor 331 determines whether the potential of the reception signal line LRX is in the state in which communication is possible (for example, the High state) using the function of the versatile input port of the reception port P2.

The inspection processor 331 outputs information indicating the determination result to the display 11 (an output). That is, the inspection processor 331 displays information indicating a result of determination of the reason for a communication abnormality between the first circuit 10 and the second circuit 20 on the display 11 to notify a user.

Operations of the electronic device 1 according to this embodiment will be described below with reference to the accompanying drawings.

Figure 2:
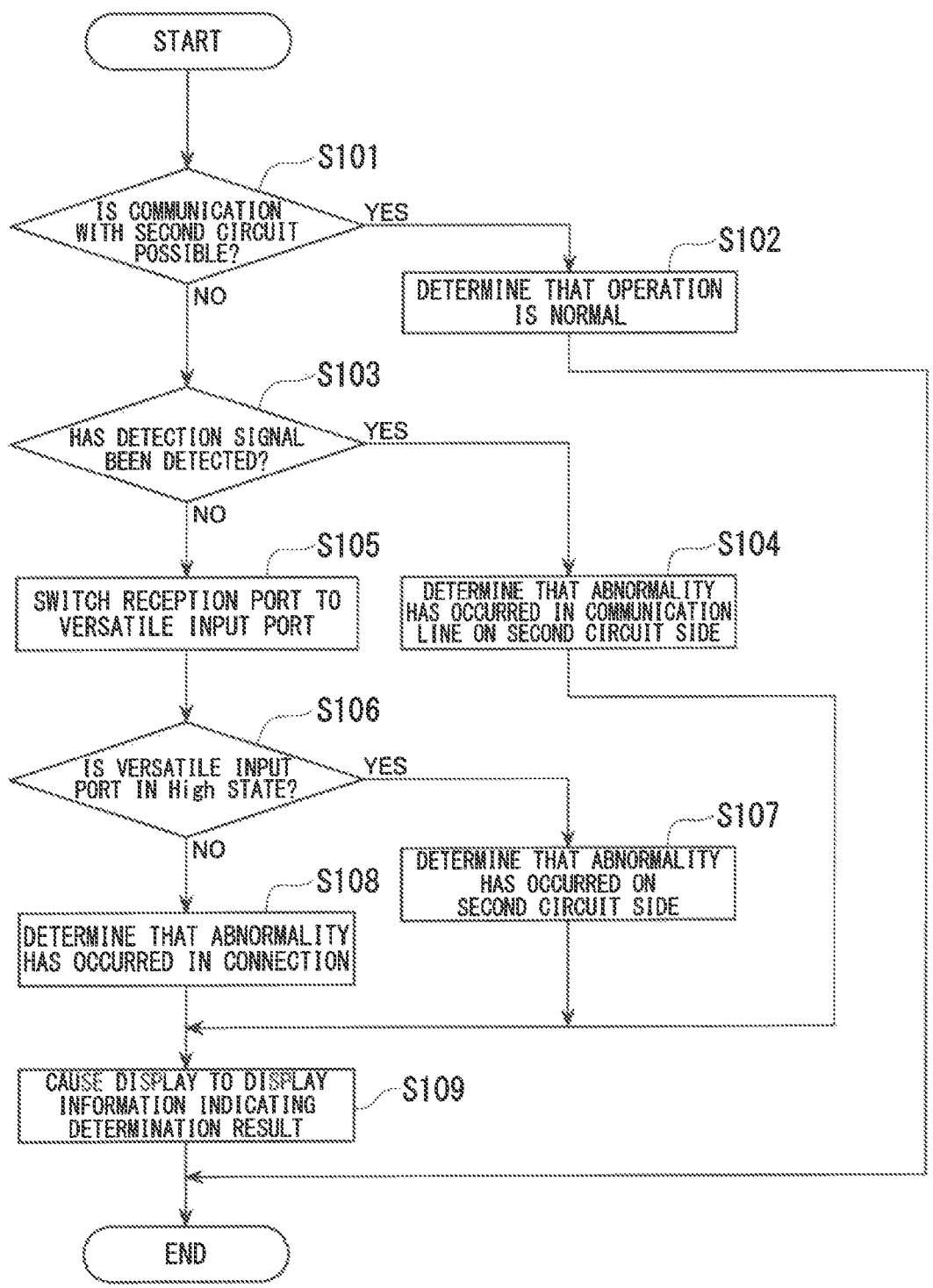
FIG. 2 is a flowchart illustrating an example of operations of the electronic device according to the first embodiment.

FIG. 2 is a flowchart illustrating an example of operations of the electronic device 1 according to this embodiment. In this drawing, a process of inspecting serial data communication (a process of detecting a communication abnormality and determining a reason) of the electronic device 1 is illustrated.

As illustrated in FIG. 2, first, the inspection processor 331 of the electronic device 1 determines whether communication with the second circuit 20 is possible (Step S101). The inspection processor 331 determines whether communication with the second circuit 20 is possible, for example, by performing data communication with the second circuit 20 and determining whether a normal response from the second circuit 20 has been received.

When communication with the second circuit 20 is possible (Step S101: YES), the inspection processor 331 causes the routine to Step S102. When communication with the second circuit 20 is not possible (Step S101: NO), the inspection processor 331 causes the routine to Step S103.

In Step S102, the inspection processor 331 determines that serial data communication with the second circuit 20 is operating normally. The inspection processor 331 ends the routine after Step S102 has been performed.

In Step S103, the inspection processor 331 determines whether a detection signal has been detected. That is, the inspection processor 331 determines whether the detection signal line LSA is in the High state. When a detection signal has been detected (when the detection signal line LSA is in the High state) (Step S103: YES), the inspection processor 331 causes the routine to Step S104. When a detection signal has not been detected (when the detection signal line LSA is in the Low state) (Step S103: NO), the inspection processor 331 causes the routine to Step S105.

In Step S104, the inspection processor 331 determines that an abnormality has occurred in a communication line on the second circuit 20 side. That is, since the detection signal line LSA is in the High state, the inspection processor 331 ascertains that the High state of the transmission signal line LTX from the first circuit 10 is delivered to the second circuit 20 and determines that an abnormality has occurred in a communication line (for example, the reception signal line LRX) on the second circuit 20 side. After Step S104 has been performed, the inspection processor 331 causes the routine to Step S109.

In Step S105, the inspection processor 331 switches the reception port P2 to the function of the versatile input port. That is, the inspection processor 331 switches the reception port P2 from the function of the reception port for serial data communication to the function of the versatile input port using the switcher 32.

Then, the inspection processor 331 determines whether the versatile input port is in the High state (Step S106). That is, the inspection processor 331 determines whether the reception signal line LRX is in the High state using the function of the versatile input port of the reception port P2. When the versatile input port is in the High state (when the reception signal line LRX is in the High state) (Step S106: YES), the inspection processor 331 causes the routine to Step S107. When the versatile input port is in the Low state (when the reception signal line LRX is in the Low state) (Step S106: NO), the inspection processor 331 causes the routine to Step S108.

In Step S107, the inspection processor 331 determines that an abnormality has occurred on the second circuit 20 side. The inspection processor 331 determines that an abnormality has not occurred in connection of the connection cable CB1 because the reception signal line LRX is in the High state and determines that the second circuit 20 is not operating because the detection signal line LSA is in the Low state. After Step S107 has been performed, the inspection processor 331 causes the routine to Step S109.

In Step S108, the inspection processor 331 determines that an abnormality has occurred in connection. That is, since the reception signal line LRX is in the Low state and the detection signal line LSA is in the Low state, the inspection processor 331 determines that an abnormality has occurred in connection of the connection cable CB1 or the like.

Then, in Step S109, the inspection processor 331 displays information indicating the determination result on the display 11. After Step S109 has been performed, the inspection processor 331 ends the routine.

As described above, the electronic device 1 according to this embodiment includes the first circuit 10. The first circuit 10 includes at least the transmission port P1 for transmitting data via the shift register 311 and the reception port P2 for receiving data via the shift register 312 and can perform data communication with the second circuit 20 via the transmission port P1 and the reception port P2. The first circuit 10 includes the inspection processor 331. When data communication with the second circuit 20 is not possible, the inspection processor 331 determines a detection signal indicating that the second circuit 20 can communicate with the first circuit 10 (for example, the detection signal line ISA is in the High state). When a detection signal has not been detected (for example, when the detection signal line LSA is in the Low state), the inspection processor 331 determines whether the potential of the reception signal line LRX connected between the reception port P2 and the second circuit 20 is in a state in which communication is possible (for example, in the High state).

Accordingly, by determining whether a detection signal (for example, the detection signal line ISA is in the High state) has been detected, the electronic device 1 according to this embodiment can determine whether data transmitted from the first circuit 10 side is transmitted to the second circuit 20 and whether the second circuit 20 is in the state in which communication is possible. In the electronic device 1 according to this embodiment, when a detection signal has not been detected, the inspection processor 331 can separately ascertain whether an abnormality has occurred in connection to the second circuit 20 or in operation of the second circuit 20 by determining whether the potential of the reception signal line LRX is in the state in which communication is possible (for example, the High state). Accordingly, the electronic device 1 according to this embodiment can appropriately determine a reason for a communication abnormality.

Since the electronic device 1 according to this embodiment can appropriately determine a reason for a communication abnormality, it is possible to identify a part causing the abnormality and to minimize a period and labor until a user or a repairman resolves the abnormality. The electronic device 1 according to this embodiment can be easily realized by only changing software as long it is a device having the aforementioned configuration.

In this embodiment, when a detection signal has been detected, the inspection processor 331 determines that an abnormality has occurred in a communication line on the second circuit 20 side associated with a signal of the reception port P2. That is, when a detection signal has been detected, the inspection processor 331 determines that an abnormality has occurred in a communication line of the second circuit 20. When the potential of the reception signal line LRX is not in the state in which communication is possible, the inspection processor 331 determines that an abnormality has occurred in connection between the first circuit 10 and the second circuit 20.

Accordingly, the electronic device 1 according to this embodiment can appropriately determine an abnormality in a communication line on the second circuit 20 side and an abnormality in connection between the first circuit 10 and the second circuit 20 as a reason for a communication abnormality.

In this embodiment, when the potential of the reception signal line LRX is in the state in which communication is possible (for example, the High state), the inspection processor 331 determines that an abnormality has occurred in the second circuit 20.

Accordingly, the inspection processor 331 can appropriately determine an abnormality in the second circuit 20 as a reason for a communication abnormality.

In this embodiment, the first circuit 10 includes the shift registers (311 and 312) connected to the transmission port P1 and the reception port P2, respectively, and serial data communication is performed between the first circuit 10 and the second circuit 20.

Accordingly, the electronic device 1 according to this embodiment can appropriately determine a reason for a communication abnormality in serial data communication.

In this embodiment, the first circuit 10 is configured to be able to switch the same port (the reception port P2) between the function of the reception port and the function of the input port. The inspection processor 331 switches the reception port P2 from the function of the reception port to the function of the input port and determines whether the potential of the reception signal line LRX is in the state in which communication is possible (for example, the High state) using the function of the input port.

Accordingly, the electronic device 1 according to this embodiment can appropriately determine a reason for a communication abnormality while curbing an increase of an inspection port because the same port (the reception port P2) is switched and used to inspect the reason for the communication abnormality. The electronic device 1 according to this embodiment can switch the reception port P2, for example, by controlling software and appropriately determine a reason for a communication abnormality, for example, without requiring an additional component such as a discrete component.

In this embodiment, the inspection processor 331 outputs information indicating the determination result to the display 11 (an output).

Accordingly, since a user can be notified of the determined reason for a communication abnormality, the electronic device 1 according to this embodiment can easily restore the communication abnormality and shorten a restoration period.

A connection inspection method according to this embodiment is a connection inspection method of inspecting connection between the first circuit 10 including at least the transmission port P1 for transmitting data via the shift register 311 and the reception port P2 for receiving data via the shift register 312 and the second circuit 20 that can perform data communication via the transmission port P1 and the reception port P2 and includes an inspection processing step. In the inspection processing step, the inspection processor 331 determines whether a detection signal indicating that the second circuit 20 can communicate with the first circuit 10 (for example, the detection signal line LSA is in the High state) has been detected when data communication with the second circuit 20 is not possible, and determines whether the potential of the reception signal line LRX connected between the reception port P2 and the second circuit 20 is in the state in which communication is possible when a detection signal has not been detected.

Accordingly, with the connection inspection method according to this embodiment, it is possible to achieve the same advantages as in the electronic device 1 and to appropriately determine a reason for a communication abnormality.

Second Embodiment

An electronic device 1a according to a second embodiment will be described below with reference to the drawings. In this embodiment, a modified example in which determination using a source voltage detection signal for detecting whether a source voltage of a second circuit 20a is supplied normally is added to the first embodiment will be described.

Figure 3:
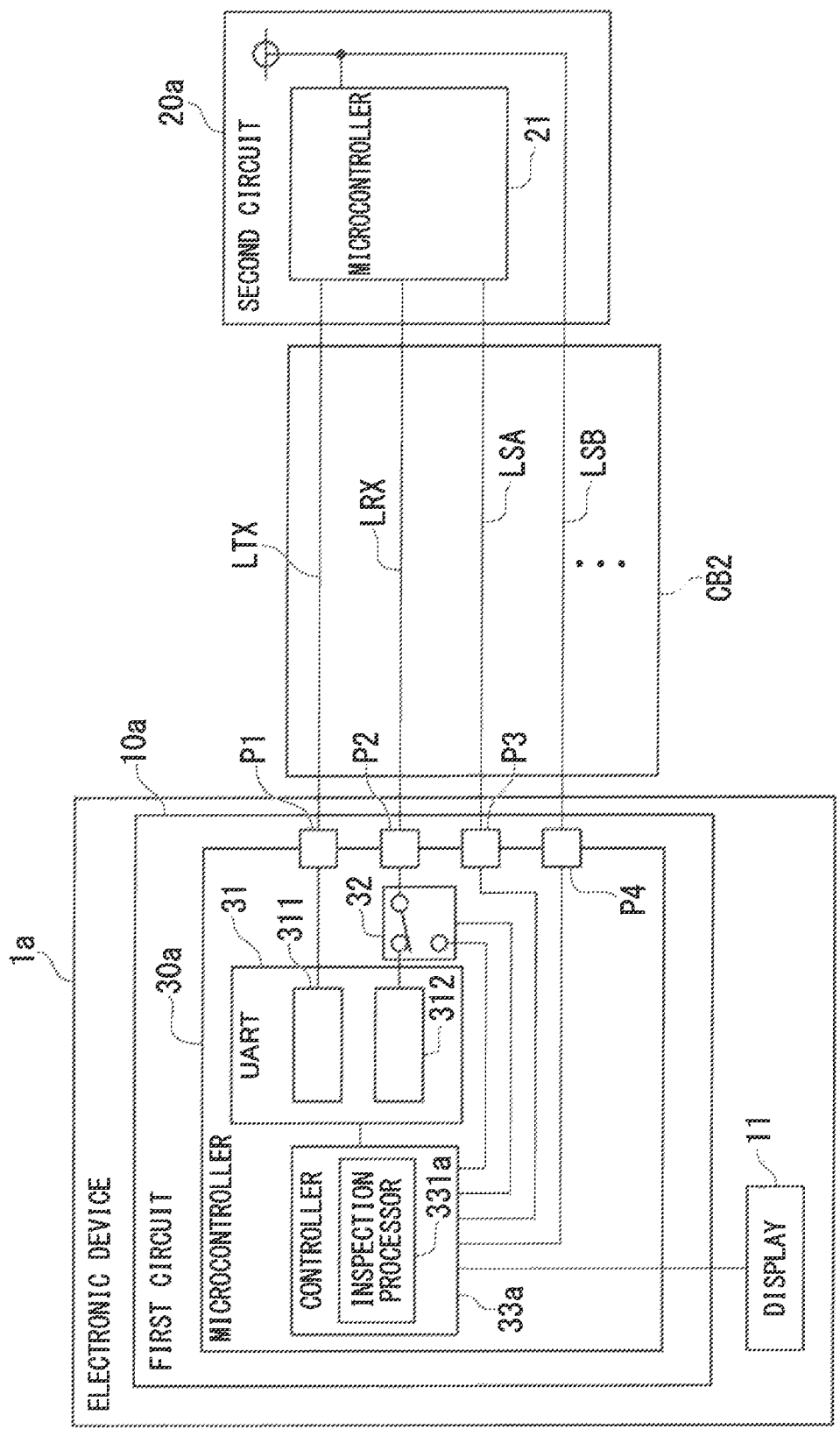
FIG. 3 is a block diagram illustrating an example of an electronic device according to a second embodiment.

FIG. 3 is a block diagram illustrating an example of the electronic device 1a according to the second embodiment.

As illustrated in FIG. 3, the electronic device 1a includes a first circuit 10a and a display 11. In FIG. 3, the same elements as described above with reference to FIG. 1 will be referred to by the same reference signs and description thereof will be omitted.

The first circuit 10a is a circuit that can be connected to a second circuit 20a via a connection cable CB2. The first circuit 10a performs data communication with the second circuit 20a, for example, using RS-232C which is an interface for serial data communication. The first circuit 10a includes a microcontroller 30a.

The connection cable CB2 is a cable for connecting the first circuit 10a and the second circuit 20a. The connection cable CB2 is the same as the connection cable CB1 in the first embodiment except that a detection signal line LSB is added.

The detection signal line LSB (an example of a source voltage detection signal line) is a signal line used for the first circuit 10a to detect a detection signal (a signal B) output from the second circuit 20a to the first circuit 10a. Here, the detection signal (the signal B) is a signal indicating whether a source voltage of the second circuit 20a is supplied normally and is in the High state when the source voltage of the second circuit 20a is supplied normally.

The second circuit 20a is a circuit that can be connected to the first circuit 10a via the connection cable CB2 and includes a microcontroller 21. The second circuit 20a is configured such that a power supply line of the second circuit 20a is connected to the detection signal line LSB, and outputs a detection signal (the signal B) indicating whether the source voltage of the second circuit 20a is supplied normally via the detection signal line LSB to the first circuit 10a.

The microcontroller 30a is, for example, a processor including a CPU and comprehensively controls the first circuit 10a. The microcontroller 30a includes a UART 31, a switcher 32, a controller 33a, a transmission port P1, a reception port P2, an input port P3, and an input port P4.

The input port P4 is a versatile input port and is connected to the detection signal line LSB of the connection cable CB2.

The controller 33a is, for example, a functioner which is realized by causing a CPU which is not illustrated to execute a program and includes an inspection processor 331a. The basic functions of the controller 33a and the inspection processor 331a am the same as the functions of the controller 33 and the inspection processor 331 described above in the first embodiment, and they are different from each other in that a process for the detection signal line LSB is added.

The inspection processor 331a detects a source voltage detection signal indicating whether the source voltage of the second circuit 20a is supplied normally (for example, a signal indicating that the detection signal line LSB is in the High state) and determines whether an abnormality has occurred in a power supply of the second circuit 20a. For example, when the detection signal line LSB is in the Low state, the inspection processor 331a determines that an abnormality has occurred in the power supply of the second circuit 20a.

Operations of the electronic device 1a according to this embodiment will be described below with reference to FIG. 4. In this drawing, a routine of inspecting serial data communication (a routine of detecting a communication abnormality and determining a reason therefor) in the electronic device 1a is illustrated. In this drawing, it is assumed that a detection signal of the detection signal line LSA is referred to as a first detection signal and a detection signal of the detection signal line LSB is referred to as a second detection signal.

Figure 4:
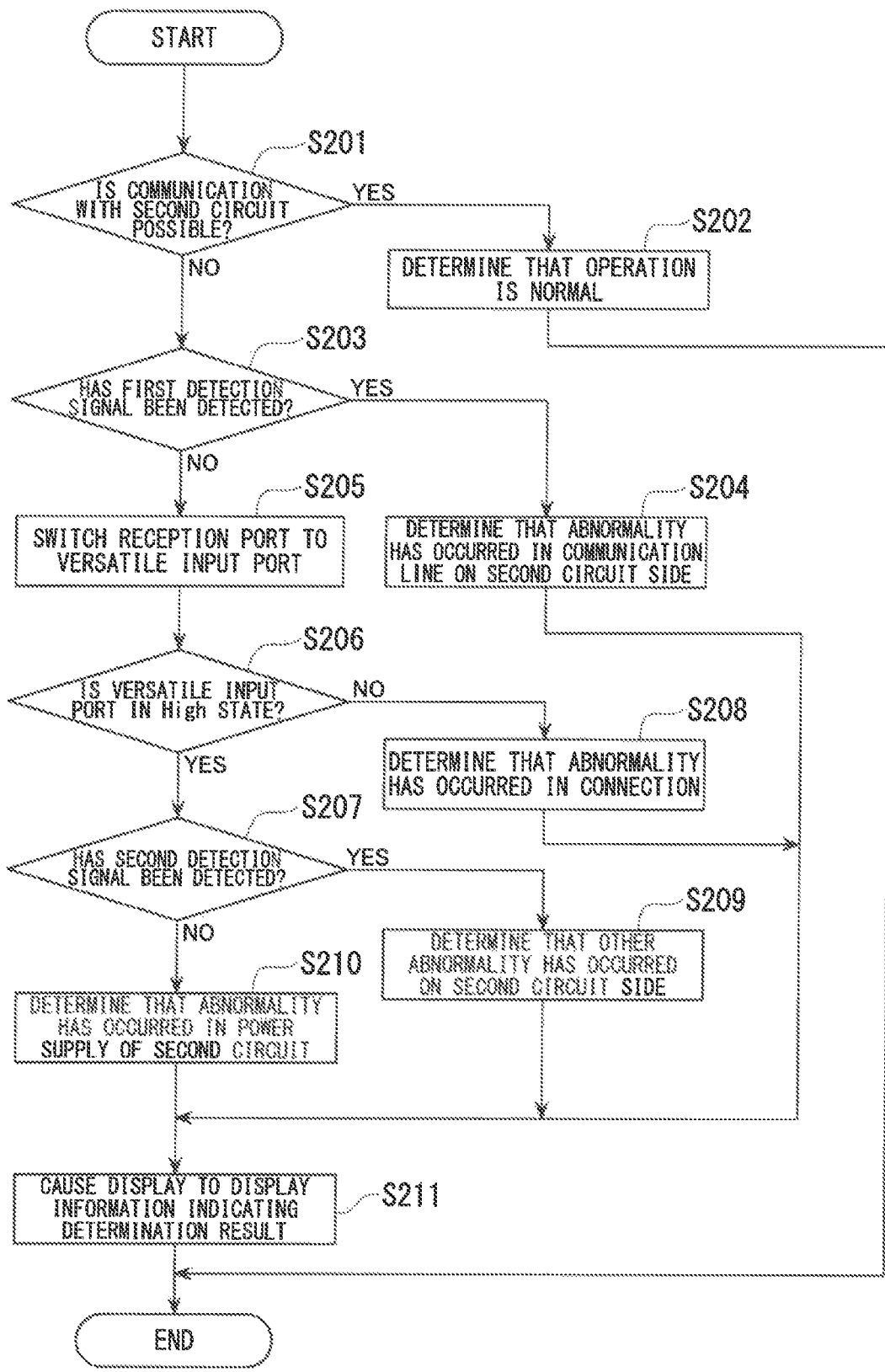
FIG. 4 is a flowchart illustrating an example of operations of the electronic device according to the second embodiment.

In FIG. 4, the processes of Steps S201 to S206 and Step S208 are the same as the processes of Steps S101 to S106 and Step S108 described above with reference to FIG. 2 and thus description thereof will be omitted. After Steps S204 and S208 have been performed, the inspection processor 331a causes the routine to Step S211.

In Step S206, the inspection processor 331a of the electronic device 1a causes the routine to Step S207 when the versatile input port is in the High state (when the reception signal line LRX is in the High state) (Step S206: YES).

In Step S207, the inspection processor 331a determines whether a second detection signal has been detected. That is, the inspection processor 331a determines whether the detection signal line LSB is in the High state. When the second detection signal has been detected (when the detection signal line LSB is in the High state)(Step S207: YES), the inspection processor 331a causes the routine to Step S209. When the second detection signal has not been detected (when the detection signal line LSB is in the Low state) (Step S207: NO), the inspection processor 331a causes the routine to Step S210.

In Step S209, the inspection processor 331a determines that another abnormality has occurred on the second circuit 20a side. That is, the inspection processor 331a ascertains that the second circuit 20a is supplied normally with a source voltage because the detection signal line LSB is in the High state, and determines that an abnormality other than that in the power supply has occurred in the second circuit 20a. After Step S209 has been performed, the inspection processor 331a causes the routine to Step S211.

In Step S210, the inspection processor 331a determines that an abnormality has occurred in the power supply of the second circuit 20a. That is, the inspection processor 331a ascertains that the second circuit 20a is not supplied normally with a source voltage because the detection signal line LSB is in the Low state, and determines that an abnormality of the power supply has occurred in the second circuit 20a.

Then, in Step S211, the inspection processor 331a displays information indicating the determination result on the display 11. After Step S211 has been performed, the inspection processor 331a ends the routine.

As described above, the electronic device 1a according to this embodiment includes the first circuit 10a, and the first circuit 10a includes the inspection processor 331a.

Accordingly, the electronic device 1a according to this embodiment can achieve the same advantages as in the first embodiment and can appropriately determine a reason for a communication abnormality.

In this embodiment, the inspection processor 331a detects the source voltage detection signal indicating whether the source voltage of the second circuit 20a is supplied normally (for example, a signal indicating that the detection signal line LSB is in the High state) and determines whether an abnormality has occurred in the power supply of the second circuit 20a.

Accordingly, the electronic device 1a according to this embodiment can appropriately determine an abnormality in the power supply of the second circuit 20a as a reason for a communication abnormality.

Third Embodiment

An electronic device 1b according to a third embodiment will be described below with reference to the drawings. In this embodiment, a modified example in which the switcher 32 in the first embodiment is not provided and an input port P5 for detecting a potential (a voltage) of a reception signal line LRX is added to the first embodiment will be described.

Figure 5:
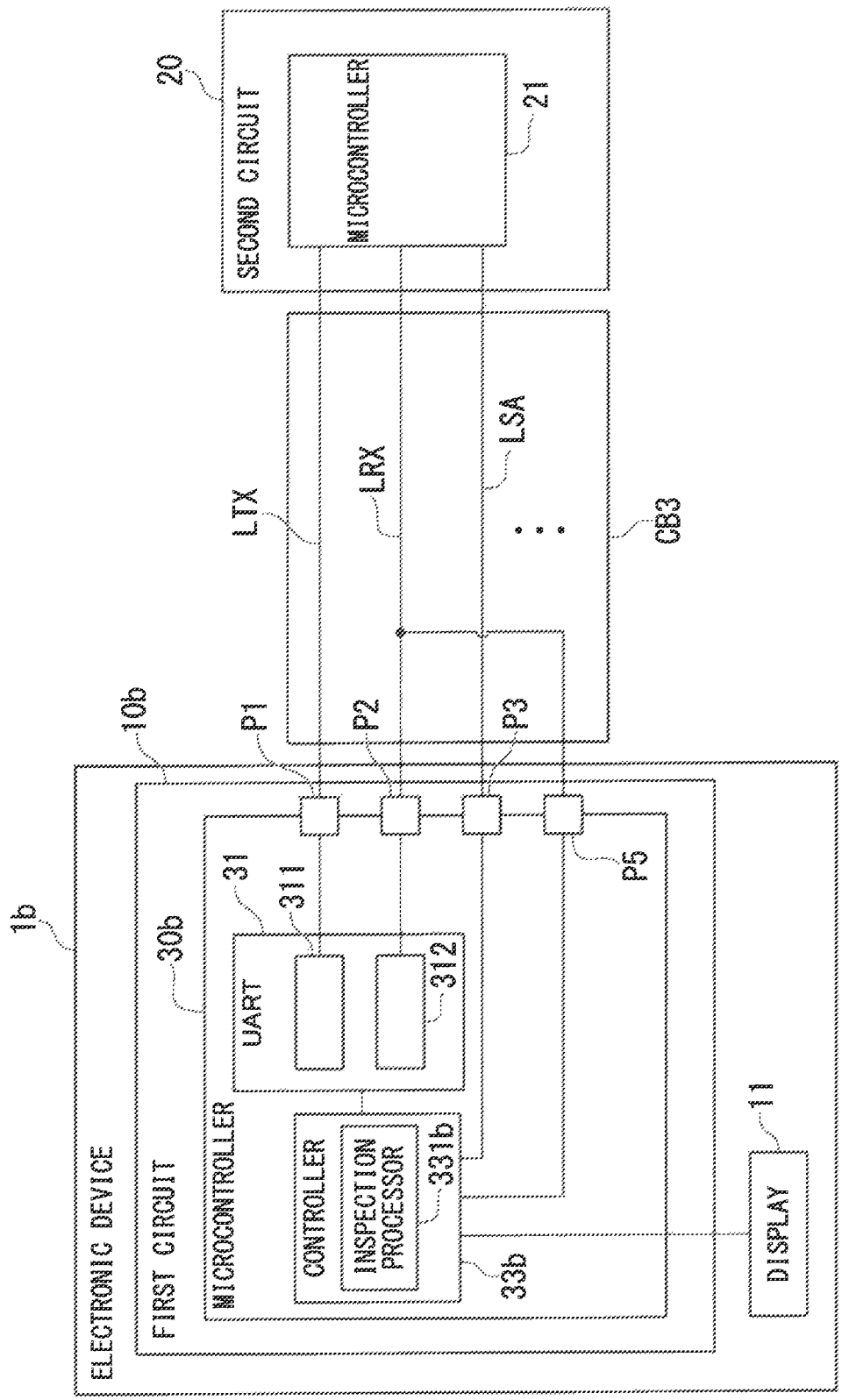
FIG. 5 is a block diagram illustrating an example of an electronic device according to a third embodiment.

FIG. 5 is a block diagram illustrating an example of the electronic device 1b according to the third embodiment.

As illustrated in FIG. 5, the electronic device 1b includes a first circuit 10b and a display 11. In FIG. 5, the same elements as described above with reference to FIG. 1 will be referred to by the same reference signs and description thereof will be omitted.

The first circuit 10b is a circuit that can be connected to a second circuit 20 via a connection cable CB3. The first circuit 10b performs data communication with the second circuit 20, for example, using RS-232C which is an interface for serial data communication. The first circuit 10b includes a microcontroller 30b.

The connection cable CB3 is a cable for connecting the first circuit Ob and the second circuit 20. In the connection cable CB3, a reception signal line LRX branches on the first circuit 10b side and a voltage of the reception signal line LRX can be detected using an input port P5 other than the reception port P2.

The microcontroller 30b is, for example, a processor including a CPU and comprehensively controls the first circuit 10b. The microcontroller 30b includes a UART 31, a controller 33b, a transmission port P1, a reception port P2, an input port P3, and an input port P5.

The input port P5 is a versatile input port and is connected to the reception signal line LRX of the connection cable CB3.

The controller 33b is, for example, a functioner which is realized by causing a CPU which is not illustrated to execute a program and includes an inspection processor 331b. The basic functions of the controller 33b and the inspection processor 331b are the same as the functions of the controller 33 and the inspection processor 331 described above in the first embodiment, and they are different from each other in that the potential of the reception signal line LRX is detected using the input port P5, instead of using the switcher 32.

The inspection processor 331b determines whether the potential of the reception signal line LRX is in the state in which communication is possible using the input port P5 when a detection signal of the detection signal line LSA (for example, the High state) has not been detected.

Operations of the electronic device 1b according to this embodiment will be described below with reference to FIG. 6. In this drawing, a routine of inspecting serial data communication (a routine of detecting a communication abnormality and determining a reason therefor) in the electronic device 1b is illustrated.

Figure 6:
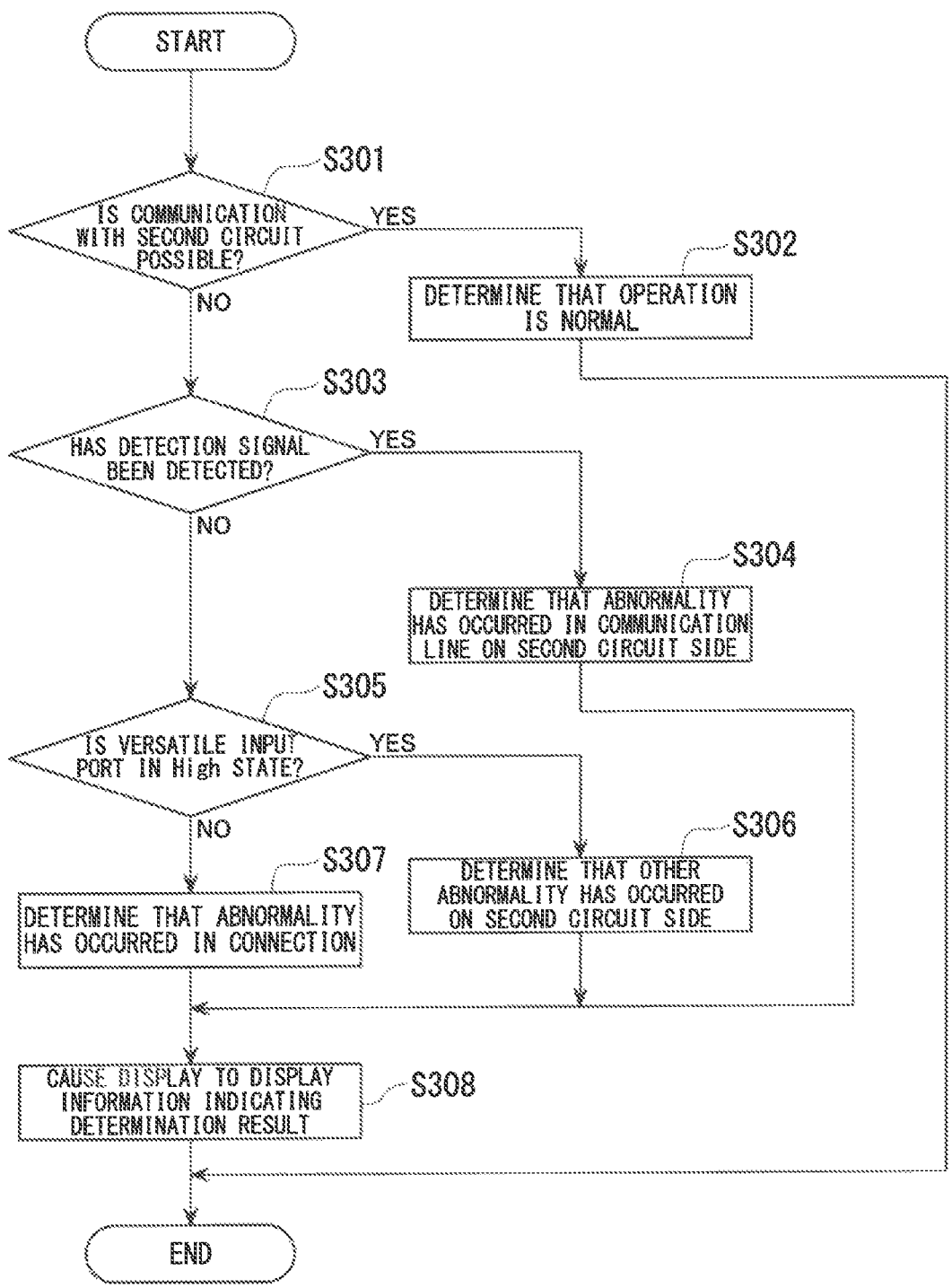
FIG. 6 is a flowchart illustrating an example of operations of the electronic device according to the third embodiment.

In FIG. 6, the processes of Steps S301 to S304 are the same as the processes of Steps S101 to S104 described above with reference to FIG. 2 and thus description thereof will be omitted. After Step S304 has been performed, the inspection processor 331b causes the routine to Step S308.

In Step S305, the inspection processor 331b of the electronic device 1b determines whether the versatile input port is in the High state. That is, the inspection processor 331b determines whether the reception signal line LRX is in the High state using the input port P5. When the input port P5 is in the High state (the reception signal line LRX is in the High state) (Step S305: YES), the inspection processor 331b causes the routine to Step S306. When the input port P5 is in the Low state (the reception signal line LRX is in the Low state) (Step S305: NO), the inspection processor 331b causes the routine to Step S307.

Subsequently, the processes of Steps S306 to S308 are the same as the processes of Steps S107 to S109 described above with reference to FIG. 2, and thus description thereof will be omitted.

As described above, the electronic device 1b according to this embodiment includes the first circuit 10b, and the first circuit 10b includes the inspection processor 331b. The first circuit 10b includes the input port P5 for detecting the potential of the reception signal line LRX, and the inspection processor 331b determines whether the reception signal line LRX is in the High state using the input port P5.

Accordingly, the electronic device 1b according to this embodiment can achieve the same advantages as in the first embodiment and can appropriately determine a reason for a communication abnormality.

Fourth Embodiment

An electronic device 100 according to a fourth embodiment will be described below with reference to FIG. 7. In this embodiment, an example of a basic configuration of the present invention will be described.

Figure 7:
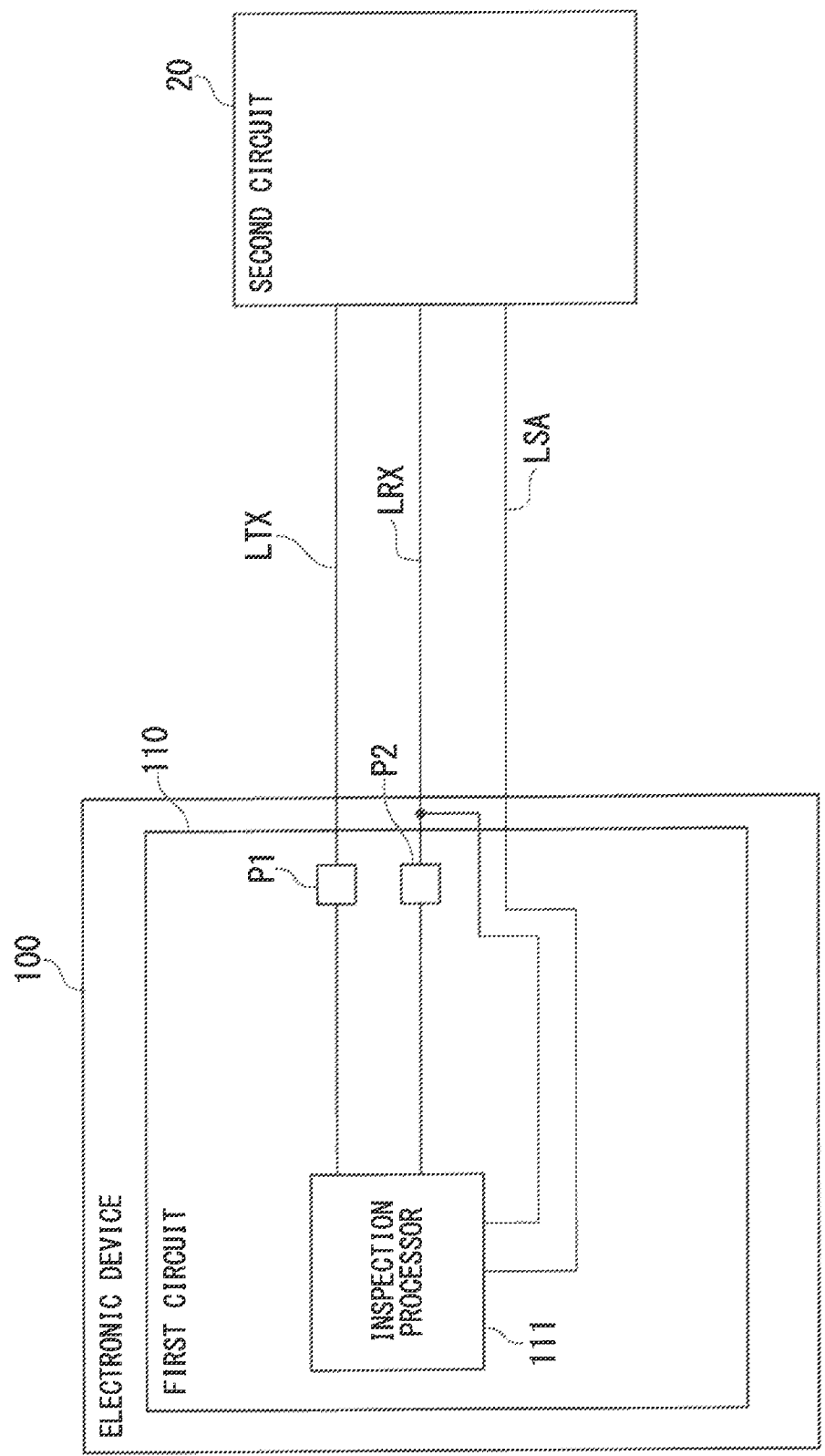
FIG. 7 is a block diagram illustrating an example of an electronic device according to a fourth embodiment.

FIG. 7 is a block diagram illustrating an example of the electronic device 100 according to the fourth embodiment.

As illustrated in FIG. 7, the electronic device 100 includes a first circuit 110. In FIG. 7, the same elements as described above with reference to FIG. 1 will be referred to by the same reference signs and description thereof will be omitted.

The first circuit 110 includes a transmission port P1 for transmitting data and a reception port P2 for receiving data. The first circuit 110 can perform data communication with the second circuit 20 via the transmission port P1 and the reception port P2. The first circuit 110 includes an inspection processor 111.

When data communication with the second circuit 20 is not possible, the inspection processor 111 determines whether a detection signal indicating that the second circuit 20 can communicate with the first circuit 110 has been detected. When the detection signal has not been detected, the inspection processor 111 determines whether a potential of the reception signal line LRX connected between the reception port P2 and the second circuit 20 is in a state in which communication is possible.

Accordingly, the electronic device 100 can appropriately determine a reason for a communication abnormality using the detection signal (for example, the detection signal line LSA is in the High state) and the potential of the reception signal line LRX.

The present invention is not limited to the aforementioned embodiments but can be modified without departing from the gist of the present invention.

For example, in the aforementioned embodiments, an example in which the first circuit 10 (10a, 10b, 110) and the second circuit 20 (20a, 20b) are connected via the connection cable CB1 (CB2, CB3) is described, but the present invention is not limited thereto. The first circuit 10 (10a, 10b, 110) and the second circuit 20 (20a, 20b) may be connected, for example, via a connector (such as a board-to-board connector) or a card slot, may be connected via wires of a board pattern on the same board, or may be connected via another means.

In the aforementioned embodiments, an example in which the second circuit 20 (20a, 20b) is provided outside of the electronic device 1 (1a, 1b, 100) is described above, but the present invention is not limited thereto and the second circuit 20 (20a, 20b) may be provided inside of the electronic device 1 (1a, 1b, 100).

In the aforementioned embodiments, an example in which data communication between the first circuit 10 (10a, 10b, 110) and the second circuit 20 (20a, 20b) is serial data communication is described above, but the present invention is not limited thereto and the data communication may be parallel data communication. An interface for data communication is not limited to the RS-232C, but may be, for example, another interface such as an I2C bus interface, a serial peripheral interface (SPI), or a universal serial bus (USB) interface.

In the first to third embodiments, an example in which the electronic device 1 (1a, 1b) includes the UART 31 is described above, but the present invention is not limited thereto and another circuit may be provided.

In the first to third embodiments, an example in which the electronic device 1 (1a, 1b, 100) outputs the determination result to the display 11 is described above, but the present invention is not limited thereto and the determination result may be output, for example, using sound from a speaker.

In the first to third embodiments, an example in which the display 11 is a display device such as a liquid crystal display is described above, but the present invention is not limited thereto and the determination result may be output using lighting of a light emitting diode or the like.

In the first to third embodiments, an example in which the electronic device 1 (1a, 1b, 100) outputs the determination result when a communication abnormality has occurred to the display 11 is described above, but a determination result when it is operating normally may be output to the display 11 (or a light emitting diode or the like).

The constituents of the electronic device 1 (1a, 1b, 100) has a computer system therein. Processes of the constituents of the electronic device 1 (1a, 1b, 100) may be performed by recording programs for realizing the functions of the constituents of the electronic device 1 (1a, 1b, 100) on a computer-readable recording medium and causing the computer system to read the programs recorded on the recording medium and to execute the programs. Here, "causing a computer system to read a program recorded on a recording medium and to execute the program" includes installing the program in the computer program. The "computer system" mentioned herein includes an OS or hardware such as peripherals.

The "computer system" may include a plurality of computer devices which are connected via a network including the Internet or a communication line such as a WAN, a IAN, or a dedicated line. The "computer-readable recording medium" is a portable medium such as a flexible disk, a magneto-optical disc, a ROM, or a CD-ROM or a storage device such as a hard disk built in the computer system. In this way, the recording medium storing programs may be a non-transitory recording medium such as a CD-ROM.

The recording medium may include a recording medium provided the inside or outside which can be accessed by a delivery server to deliver the programs. A program may be divided into a plurality of pieces, and the plurality of pieces of the program may be downloaded at different timings and then be incorporated into the constituents of the electronic device 1 (1a, 1b, 100) or the plurality of pieces of the program may be delivered by different delivery servers. The "computer-readable recording medium" includes a medium that holds a program for a predetermined time such as a volatile memory (RAM) in a computer system serving as a server or a client when the program is transmitted via a network. The program may be for realizing some of the aforementioned functions. The program may be a medium, that is, a so-called differential file (a differential program), that can realize the aforementioned functions in combination with a program recorded in advance in the computer system.

Some or all of the aforementioned functions may be realized as an integrated circuit such as a large-scale integration (LSI) circuit. The aforementioned functions may be individually realized by processors or some or all thereof may be integrated as a processor. The integration technology is not limited to LSI, but may be realized by a dedicated circuit or a versatile processor. When integration technology replacing LSI appears with advancement in semiconductor technology, an integrated circuit based on the technology may be used.

REFERENCE SIGNS LIST 1, 100 Electronic device
10, 10a, 10b, 110 First circuit
11 Display
20, 20a Second circuit
21, 30, 30a, 30b Microcontroller
31 UART
32 Switcher
33, 33a, 33b Controller
311, 312 Shift register
331, 331a, 331b, 111 Inspection processor
CB1, CB2, CB3 Connection cable
LTX Transmission signal line
LRX Reception signal line
LSA, LSB Detection signal line
P1 Transmission port
P2 Reception port
P3, P4, P5 Input port

The invention claimed is:

1. An electronic device comprising:
   a first circuit comprising:
      a transmission port through which data is transmitted;
      a reception port through which data is received and configured to be able to perform data communication with a second circuit through the transmission port and the reception port; and
      an input port other than the transmission port and the reception port,
   wherein the first circuit comprises an inspection processor configured to determine whether a detection signal indicating that the second circuit is able to communicate with the first circuit has been detected by the input port when data communication with the second circuit is not possible by the transmission port and the reception port and to determine whether a potential of a reception signal line connected between the reception port and the second circuit is in a state in which communication is possible when the detection signal has not been detected.

2. The electronic device according to claim 1, wherein the inspection processor determines that an abnormality has occurred in a communication line of the second circuit when the detection signal has been detected.

3. The electronic device according to claim 1, wherein the inspection processor determines that an abnormality has occurred in connection between the first circuit and the second circuit when the potential of the reception signal line is not in the state in which communication is possible.

4. The electronic device according to claim 1, wherein the inspection processor determines that an abnormality has occurred in the second circuit when the potential of the reception signal line is in the state in which communication is possible.

5. The electronic device according to claim 1, wherein the first circuit includes shift registers that are connected to the transmission port and the reception port, and serial data communication is performed between the first circuit and the second circuit.

6. The electronic device according to claim 1, wherein the first circuit is configured to be able to switch the same port between a function of the reception port and a function of the input port, and
wherein the inspection processor switches the function of the reception port to the function of the input port and determines whether the potential of the reception signal line is in the state in which communication is possible using the function of the input port.

7. The electronic device according to claim 1, wherein the inspection processor detects a source voltage detection signal indicating whether a source voltage of the second circuit is supplied and determines whether an abnormality has occurred in a power supply of the second circuit.

8. The electronic device according to claim 1, wherein the inspection processor outputs information indicating a determination result to an output.

9. A connection inspection method of detecting connection between a first circuit including at least
a transmission port through which data is transmitted and a reception port through which data is received,
a second circuit configured to be able to perform data communication through the transmission port and the reception port, and
an input port other than the transmission port and the reception port,
the connection inspection method comprising:
determining whether a detection signal indicating that the second circuit is able to communicate with the first circuit has been detected by the input port when data communication with the second circuit is not possible by the transmission port and the reception port; and
determining whether a potential of a reception signal line connected between the reception port and the second circuit is in a state in which communication is possible when the detection signal has not been detected.

10. The electronic device according to claim 1, wherein the second circuit is outside of the electronic device.

11. The electronic device according to claim 1, wherein the second circuit is provided inside of the electronic device.

12. A connection inspection method of detecting connection between a first circuit and a second circuit, the connection inspection method comprising:
transmitting data by a transmission port;
receiving data by a reception port;
determining whether a detection signal indicating that the second circuit is able to communicate with the first circuit has been detected by an input port other than the transmission port and the reception port when the first circuit is not possible to perform data communication with the second circuit; and
determining whether a potential of a signal line connected to the reception port is in a state in which communication is possible when the detection signal has not been detected.

* * * * *